Oct. 19, 1926.
R. O. STOKES
1,603,996
APPARATUS FOR SEPARATING SOLIDS FROM LIQUIDS
Filed Dec. 19, 1925  5 Sheets-Sheet 1
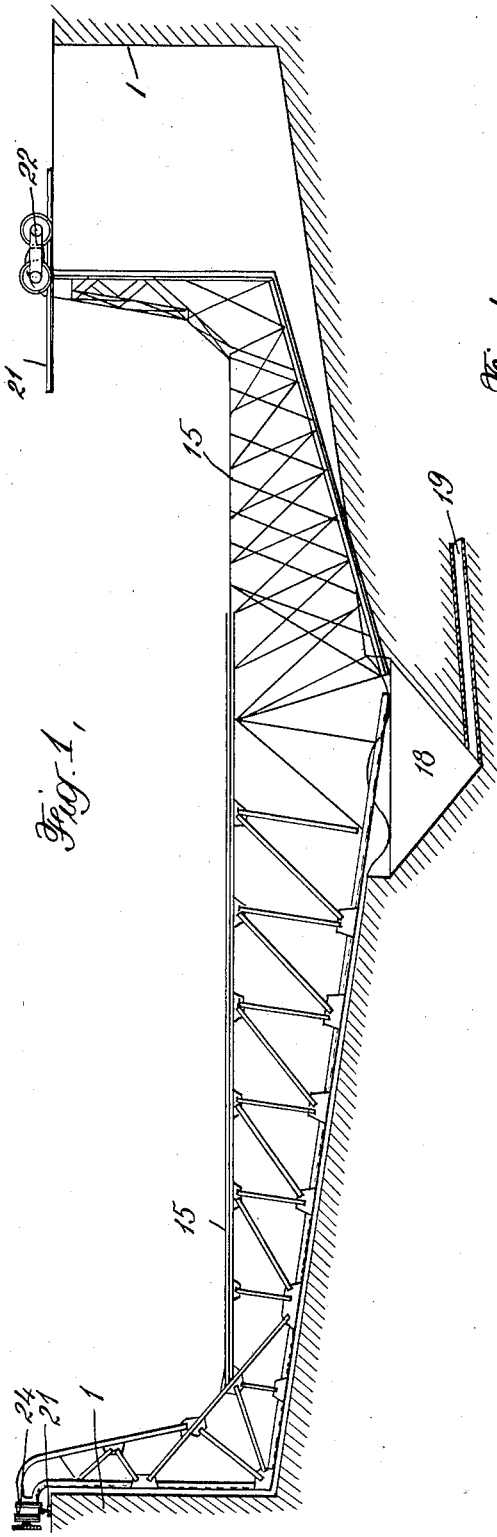
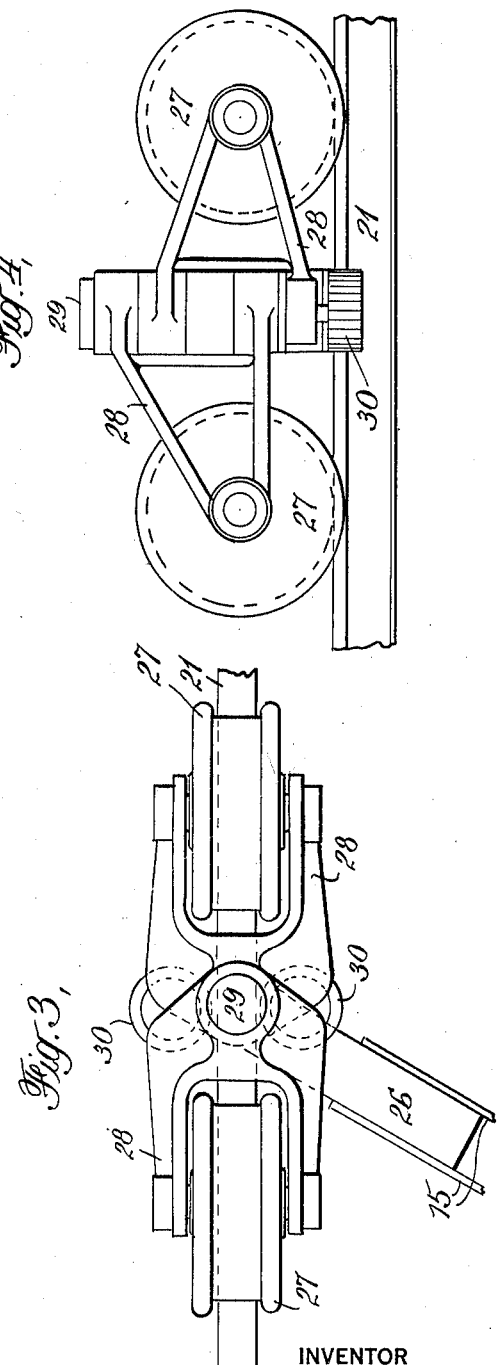
INVENTOR
Rupert Octavius Stokes
BY
ATTORNEYS

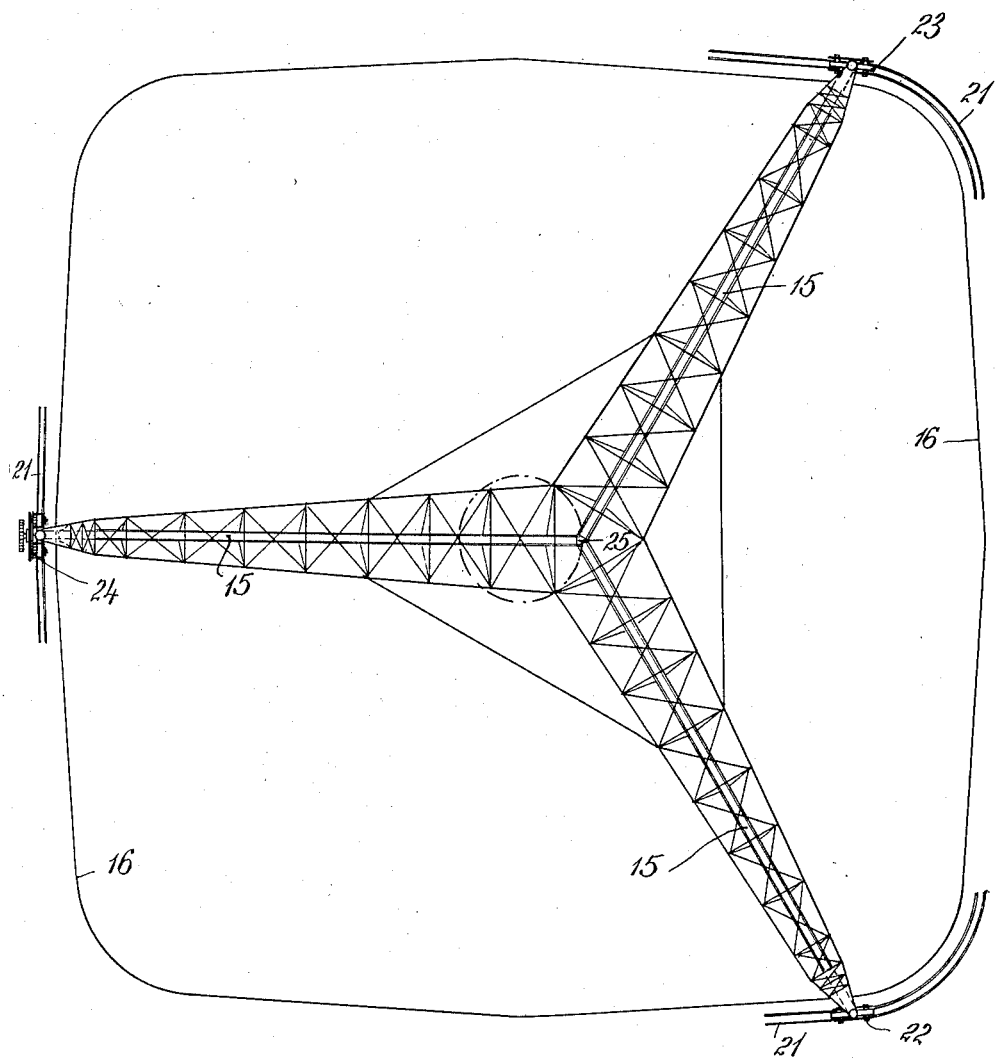

Oct. 19, 1926. 1,603,996
R. O. STOKES
APPARATUS FOR SEPARATING SOLIDS FROM LIQUIDS
Filed Dec. 19, 1925   5 Sheets-Sheet 3
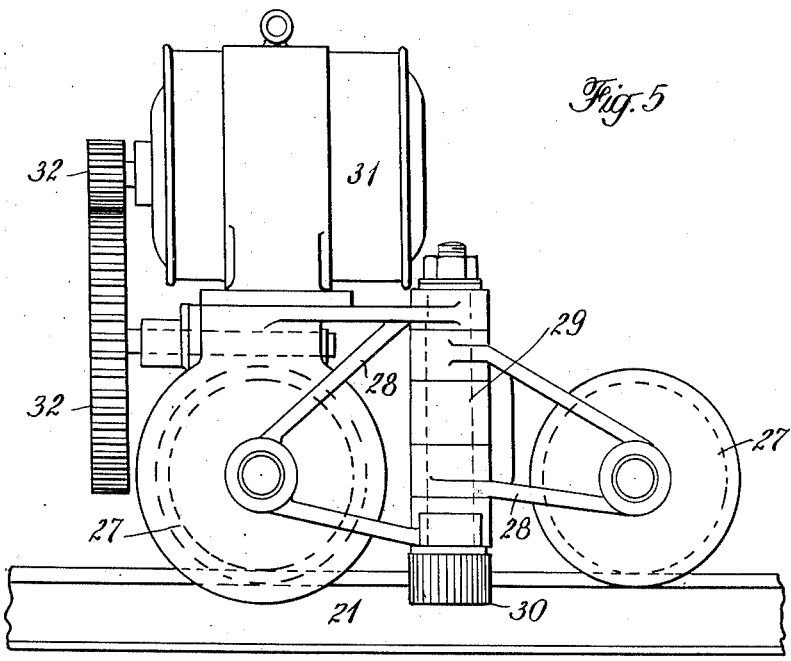
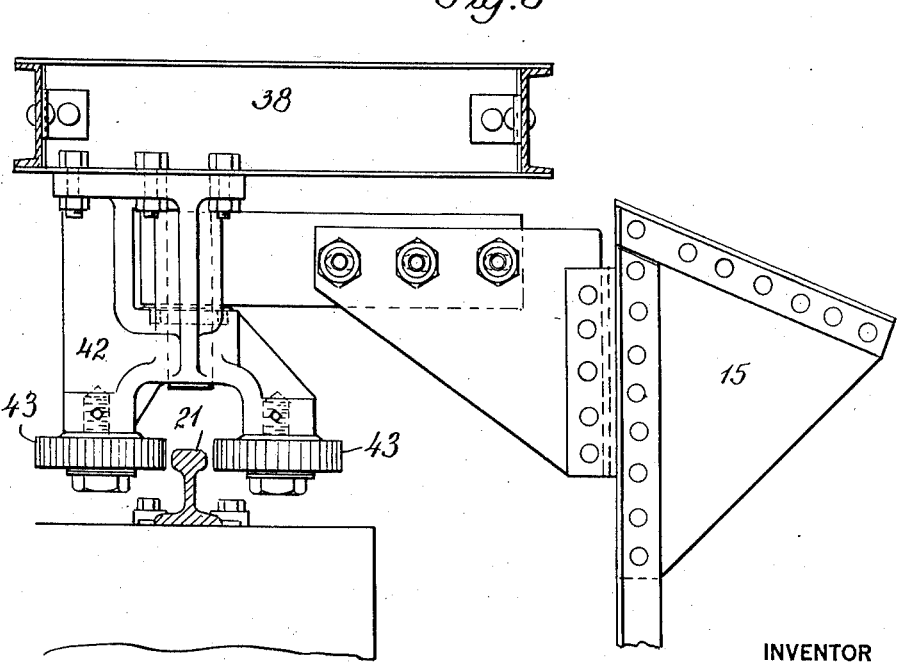
INVENTOR
Rupert Octavius Stokes
BY
ATTORNEYS Oct. 19, 1926.
R. O. STOKES
1,603,996
APPARATUS FOR SEPARATING SOLIDS FROM LIQUIDS
Filed Dec. 19, 1925    5 Sheets-Sheet 4
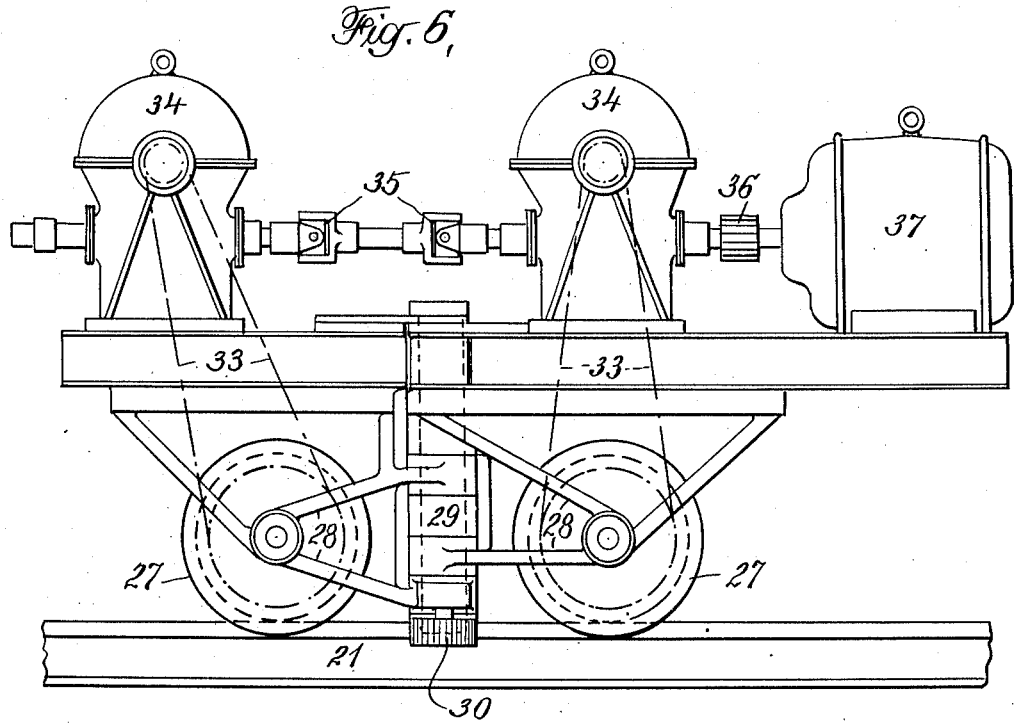
Fig. 6,
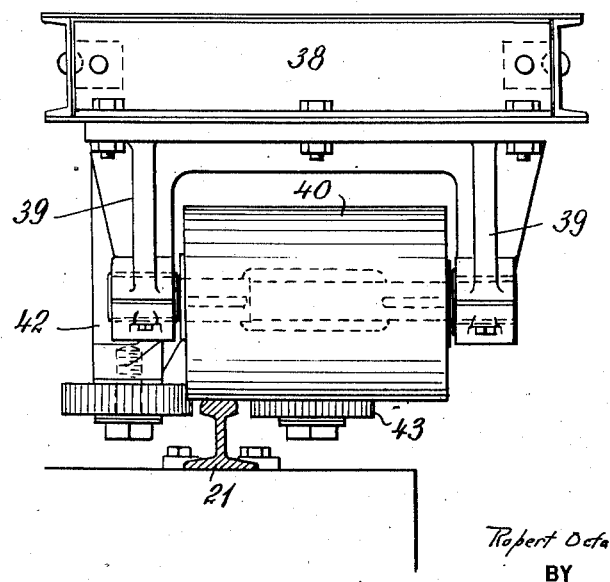
Fig. 10,
INVENTOR
Robert Octavius Stokes
BY
Pennie Davis Marvin & Edmonds
ATTORNEYS Oct. 19, 1926.
R. O. STOKES
1,603,996
APPARATUS FOR SEPARATING SOLIDS FROM LIQUIDS
Filed Dec. 19, 1925      5 Sheets-Sheet 5
*Fig. 9,*
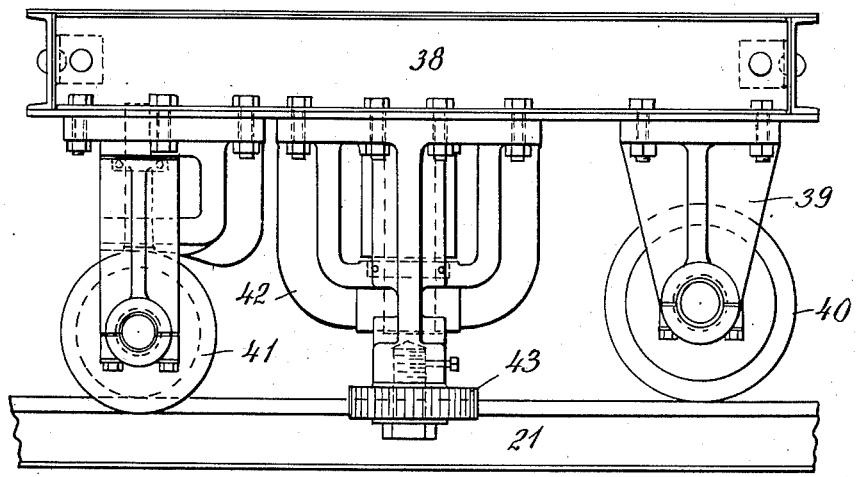
*Fig. 7,*
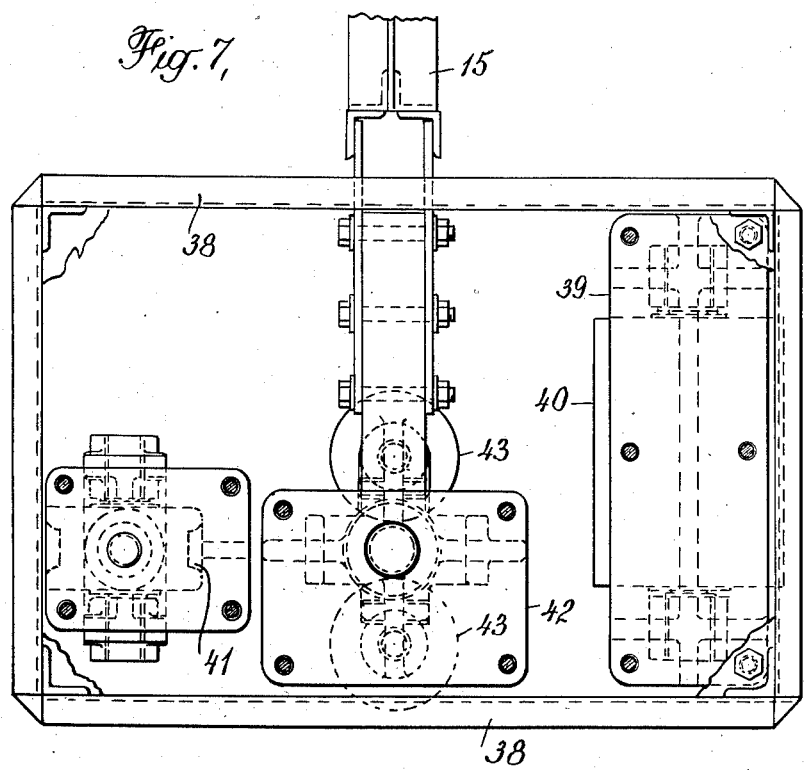
INVENTOR
Rupert Octavios Stokes
BY
Pennie Davis Marvin & Edmonds
ATTORNEYS Patented Oct. 19, 1926.

1,603,996

UNITED STATES PATENT OFFICE.

RUPERT OCTAVIUS STOKES, OF LONDON, ENGLAND.

APPARATUS FOR SEPARATING SOLIDS FROM LIQUIDS.

Application filed December 19, 1925, Serial No. 76,414, and in Great Britain October 3, 1924.

The invention relates to square tanks for treating liquids with or without mixture with solids, and consists particularly in the provision of revolving arms which explore the corners of the tank.

The invention is based upon the fact that if an arm be caused to turn about the end of another arm which itself turns about a fixed point, then if the arms be properly proportioned, and the first arm revolves in space at one third the rate of the second arm and in the opposite direction, then the end of the arm will describe a figure which is substantially in the form of a square with rounded corners.

If, for example, $r$ be the radius of the circle described by the crank pin, a point on the rod at a distance from the axis of the crank pin equal to $$\frac{2r}{(2-\sqrt{3})}$$

will describe approximately a square of which the side is equal to $$\frac{2r\sqrt{3}}{(2-\sqrt{3})}.$$

Two or three rods turning about the crank pin, fast with one another, and inclined to one another at 120° may be used. They will all describe the same curve.

My invention consists in an application of the converse of the above stated facts. I obtain the motion of the arms by constructing the wall of a tank substantially square but having the corners slightly rounded off, and by laying a rail or rails around the wall on which runs a bogie driven by an electric motor which picks up current from the track, such motor being connected to one end of one of three arms radiating from a common point and inclined to one another at 120°, the length of each arm bearing to the side of the square substantially the ratio of 1 to $\sqrt{3}$, but this ratio need not be precisely observed.

It will be understood that as the bogie moves round the track, the frame consisting of the three arms will be constrained to move in a similar way to that in which the three rods move as above described. Preferably the outer end of each arm would be supported by a bogie.

In the accompanying drawings, which illustrate my invention, Figure 1 is a section of a form of sewage clarifier, Figure 2 is a plan view of Figure 1, Figure 3 is a detail of Figures 1 and 2 showing a plan of an idle trolley, Figure 4 is an elevation of Figure 3, Figure 5 is an elevation of a driving trolley, Figure 6 is an elevation of an alternative form of driving trolley, and Figures 7, 8, 9 and 10, are views of a modified form of trolley.

Figures 1 and 2 show an apparatus in which the ends of the arms 15 are compelled to describe a path of substantially square form with rounded corners by laying a rail or rails 21 near the wall of the tank 1 and supporting the ends of the arms on bogies or trucks 22, 23 and 24, running on the track. One of the trucks, indicated by 24 in Figures 1 and 2, is driven by an electric or other motor. The path of the ends of the arms within the tank is shown at 16 and the path of the central point where the arms meet is indicated by 25. The sludge is collected by the action of the arms into a conical pit 18 in the centre of the tank, whence it is withdrawn through a pipe 19.

Figures 3 and 4 are respectively a plan and elevation of a suitable form of non-driving truck. 15 is one of the revolving arms shown in this instance with a sliding end piece 26 to accommodate irregularities in the track. The truck runs on rollers 27, 27, carried in brackets 28, 28, capable of turning round a vertical pivot 29. The truck is thus enabled to accommodate itself to the curves of the track. 30, 30, are guide rollers which bear against the track rail or rails.

Figure 5 is a form of driving truck similarly constructed but fitted with an electric motor 31 which picks up current from the rail and drives one of the truck wheels by reduction gear wheels 32, 32, and worm gearing.

Figure 6 shows another form of driving truck in which both wheels are driven by bands 33, 33, from reduction gearing contained in casings 34, 34. The shafting comprises a double Hooke's joint 35 and is driven by a coupling 36 from the motor 37.

Figures 7, 8, 9 and 10, show another construction of truck. 38 is a frame bolted to one of the arms 15. Mounted on the underside and at one end of the frame by fixed brackets 39 is a roller 40, which rides on the rail 21. At the other end of the frame is a flanged swivelling roller 41, and between the two rollers is a bracket 42 carrying a pair of rollers 43 which bear against the side of the rail. In order to take the curves of the rail roller 40 is unsymmetrically placed, as shown, with respect to the pivot of the swivelling frame of the roller 41 and the bracket 42.

It will be understood that many modifications of this form of driving and carrying mechanism are possible.

What I claim is:—

1. Apparatus for separating solids from liquids comprising in combination a tank of substantially square shape, a rail track having rounded corners bordering the tank, three arms rigidly connected to a common axis at 120° apart, the said arms being immersed in the tank, and means guided by the track for supporting the arms.

2. Apparatus for separating solids from liquids, comprising in combination a tank of substantially square shape, a rail track having rounded corners bordering the tank, three arms rigidly connected to a common axis at 120° apart, the said arms being immersed in the tank, and means guided by the track for supporting the arms, said means consisting of trolleys pivoted on the arms.

3. In apparatus for separating solids from liquids as claimed in claim 2, means for driving one of the said trolleys electrically.

4. Apparatus for separating solids from liquids as claimed in claim 2, in which each trolley comprises a carriage, two double flanged track wheels arranged tandem wise and pivotally mounted on the said carriage, and lateral guide rollers engaging the sides of the track.

5. An apparatus for treating a mixture of solids and liquids which is contained in a tank substantially square in shape to separate the solids from the liquids, which comprises the combination of a track substantially square in shape extending around the tank, a treating device within the tank having a rigid arm which extends from a point near the centre of the tank to a point adjacent the track, a bogie secured to the end of the arm and adapted to run on the track and propelling mechanism for propelling the bogie around the track whereby the treating device is rotated relative to the tank.

6. An apparatus for treating a mixture of solids and liquids which is contained in a tank substantially square in shape to separate the solids from the liquids, which comprises the combination of a track substantially square in shape extending around the tank, a pit in the bottom of the tank positioned centrally thereof, a treating device within the tank having a rigid arm which extends from a point adjacent the edge of the pit within the tank to a point adjacent the track outside the tank, a bogie secured to the end of the arm and adapted to run on the track and propelling mechanism for propelling the bogie around the track whereby the outermost end of the arm explores the corners of the tank and the innermost end of the arm travels around the pit.

7. An apparatus for treating a mixture of solids and liquids which is contained in a tank substantially square in shape to separate the solids from the liquids, which comprises the combination of a track substantially square in shape extending around the tank, a pit in the bottom of the tank positioned centrally thereof, a treating device within the tank having a rigid arm which extends from a point adjacent the edge of the pit within the tank to a point adjacent the track outside the tank, a bogie secured to the end of the arm and adapted to run on the track and propelling mechanism for propelling the bogie around the track whereby the outermost end of the arm explores the corners of the tank and the innermost end of the arm travels around the pit in a direction opposite to the direction of movement of the bogie around the track.

8. An apparatus for treating a mixture of solids and liquids which is contained in a tank substantially square in shape to separate the solids from the liquids, which comprises the combination of a track substantially square in shape extending around the tank, a pit positioned centrally of the bottom of the tank, a treating device within the tank having a plurality of rigidly connected arms all of which extend from a point adjacent the edge of the pit to points out of the tank and adjacent the track, a bogie secured to the outermost end of each arm and adapted to run on the track, and mechanism for propelling the bogies around the track whereby the outermost end of each arm explores the corners of the tank and the innermost end of each arm travels around the pit.

9. An apparatus for treating a mixture of solids and liquids which is contained in a tank substantially square in shape to separate the solids from the liquids, which comprises the combination of a track substantially square in shape extending around the tank, a pit positioned centrally of the bottom of the tank, a treating device within the tank having a plurality of rigidly connected arms all of which extend from a point adjacent the edge of the pit to points out of the tank and adjacent the track, a bogie secured to the outermost end of each arm and adapted to run on the track, and mechanism for propelling the bogies around the track whereby the outermost end of each arm explores the corners of the tank and the innermost end of each arm travels around the pit in a direction opposite to the direction of movement of the outer ends of the arms around the track.

10. An apparatus for treating a mixture of solids and liquids which is contained in a tank substantially square in shape to separate the solids from the liquids, which comprises the combination of a track substantially square in shape extending around the tank, a pit positioned centrally of the bottom of the tank, a treating device within the tank including three arms, spaced 120° apart, which extend from a point at the edge of the pit to points outside the tank and adjacent the track, a bogie secured to the outermost end of each arm and adapted to run on the track, and mechanism for propelling the bogies around the track whereby the outermost end of each arm explores the corners of the tank and the innermost end of each arm travels around the circumference of the pit in a direction opposite to the direction of movement of the outer ends of the arms around the track.

11. An apparatus for treating a mixture of solids and liquids which is contained in a tank substantially square in shape to separate the solids from the liquids, which comprises the combination of a track substantially square in shape extending around the tank, a pit positioned centrally of the bottom of the tank, a treating device within the tank including three arms, spaced 120° apart, which extend from a point at the edge of the pit to points outside the tank and adjacent the track, a bogie secured to the outermost end of each arm and adapted to run on the track, and mechanism for propelling the bogies around the track whereby the outermost end of each arm explores the corners of the tank and the innermost end of each arm travels around the circumference of the pit in a direction opposite to the direction of movement of the outer ends of the arms around the track and a sliding connection between each arm and its bogie to accommodate irregularities in the tank.

12. An apparatus for treating a mixture of solids and liquids which comprises the combination of a tank substantially square in shape for containing a mixture, and a treating device disposed within the tank for treating the mixture, this treating device consisting of an arm which extends from a point removed from the center of the tank to the edge thereof, means for actuating the arm connected to the outer end thereof whereby the outer end thereof explores the corners of the tank and the inner end travels in a path around the center of the tank.

13. An apparatus for treating a mixture of solids and liquids which comprises the combination of a tank substantially square in shape for containing a mixture, and a treating device disposed within the tank for treating the mixture, this treating device consisting of a plurality of arms, these arms having their inner ends joined together rigidly at a point removed from the center of the tank and extending radially from this point to the edge of the tank, means for actuating the device whereby the outer ends of the arm explore the corners of the tank and their inner ends travel in a path around the center of the tank.

14. An apparatus for treating a mixture of solids and liquids which comprises the combination of a tank substantially square in shape for containing a mixture, and a treating device disposed within the tank for treating the mixture, this treating device consisting of three arms spaced 120° apart, the inner ends of the arms being joined together and the outer ends of the arms terminating adjacent the edge of the tank, means for rotating the device whereby the outer ends of the arms explore the corners of the tank.

15. An apparatus for treating a mixture of solids and liquid which comprises the combination of a tank substantially square in shape for containing a mixture, and a treating device disposed within the tank for treating the mixture, this treating device consisting of three arms spaced 120° apart, the inner ends of the arms being joined together and the outer ends of the arms terminating adjacent the edge of the tank, a pit in the bottom of the tank located centrally thereof, and means for rotating the device whereby the outer ends of the arms explore the corners of the tank and the point of juncture of the arms travels in a path around the pit.

16. An apparatus comprising a tank substantially rectangular in form, a rigid arm supported to swing within the tank, and actuating means connected to the outer end of the arm whereby the outer end is caused to explore the corners of the tank while the inner end describes a circle about the centre of the tank in the direction opposite to the direction of movement of the outer end of the arm.

In testimony that I claim the foregoing as my invention, I have signed my name this 20th day of November, 1925.

RUPERT OCTAVIUS STOKES.